Figure 1:
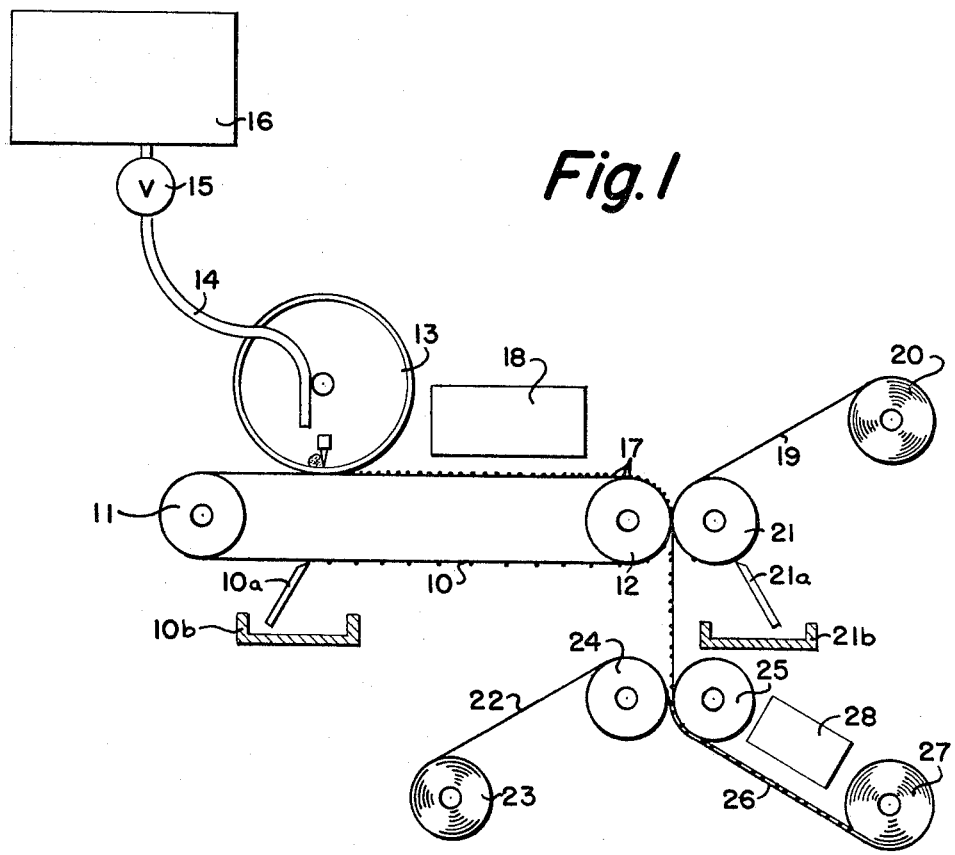

United States Patent Office 3,383,263
Patented May 14, 1968

3,383,263
METHOD FOR PREPARING FABRIC LAMINATE
Michael Storti, Barrington, R.I., assignor to Rohm & Haas Company, Philadelphia, Pa., a corporation of Delaware
Filed Apr. 26, 1966, Ser. No. 545,408
9 Claims. (Cl. 156—235)

This invention relates to a method of preparing fabric laminates. More particularly, this invention relates to a method for preparing fabric laminates by uniting fabric components by means of regularly recurring spaced geometric units of substantially dry adhesive film which are applied in a transfer-coating process and sandwiched between the mating surfaces of the fabrics. Further, this invention relates to fabric laminates produced according to the method of this invention wherein one of the fabric components comprises raised patterned portions and recessed background portions.

The prior art teaches various methods for laminating fabrics, most of which involve the direct deposit of a wet adhesive onto the mating surface of one of the fabrics. Generally, the adhesive which is a solution or emulsion is absorbed at least in part by the fabric. This partial absorption decreases the ability of the adhesive to laminate which necessitates an increased amount of adhesive in order to obtain satisfactory lamination. Of even greater significance, is the fact that the absorbed adhesive detrimentally modifies the hand of the fabric so as to result in a laminate having a rigid, harsh feel. This problem is particularly evident where the laminate is made up of a fabric having raised patterned areas and recessed open areas such as a lace on a solid backing fabric. Of course, not only is the hand of the fabric unacceptable, but the dried adhesive shows through the open spaces so as to result in a laminate lacking aesthetic appeal. Related art is evidenced by the following representative United States Patents: 281,172, 1,818,459, 2,014,460, 2,037,398, 2,402,176, 2,586,208, 2,679,965, and 3,117,905.

Fabric laminates according to the present invention overcome the problems of the prior art since they do not utilize the emulsion or solution type adhesive in that form, but in place thereof, they employ regularly recurring spaced geometric units of a substantially dry thin film having elastomeric and adhesive properties. Since there is no loss of adhesive due to absorption, a smaller total amount is required in order to obtain similar strength. While the increased strength with reduced amounts of adhesive resulting from the use of a film rather than a wet adhesive is a valuable and useful property, the present invention is particularly novel because of the ability to laminate lace type materials without detrimentally modifying the hand of the laminate.

An object of this invention is to provide a method for preparing novel fabric laminates.

Another object of this invention is to provide a method of preparing fabric laminates having excellent hand.

Yet another object of this invention is to produce a fabric laminate in a convenient and economical process.

Other objects and advantages of this invention will be apparent upon further reading of the disclosure hereinafter set forth.

The method of preparing the novel fabric laminates of this invention consists of a simple, economic process which comprises essentially six (6) individual but related stages:

(1) Regularly recurring spaced geometric units in the range of about 50 to 400 units per square inch of a defined elastomeric adhesive emulsion are deposited on a release surface in sufficient thickness so as to give a discontinuous pattern of regularly recurring spaced geometric units wherein each unit has a thickness when substantially dry in the range of 0.001 to 0.010 inch, preferably 0.002 to 0.005 inch.

(2) The adhesive emulsion pattern in the form of regularly recurring spaced geometric units so deposited is substantially dried so as to reduce the moisture content to the range of 0 to 15%, preferably 2 to 9% based on the total weight of the film.

(3) After the film units are dried to the designated moisture content, they are brought into contact with a finishing fabric which comprises raised patterned portions and recessed background portions.

(4) Only those individual units of adhesive film being contacted by the raised patterned areas of the fabric are transferred onto the finishing fabric.

(5) Thereafter, a second or backing fabric is laminated onto the finishing fabric with an effective amount of adhesive film units sandwiched between said backing fabric and the raised patterned portions of the finishing fabric.

(6) Finally, the fabric laminate is subjected to heat and pressure so as to cure the elastomeric adhesive composition.

Adhesive compositions suitable for forming the novel laminations herein described comprise a latex of an elastomeric acrylic copolymer containing amido and/or methylolamido functionality along with an aminoplast and preferably a catalyst. Such compositions are set forth and described in United States Patents Nos. 3,033,811 and 3,157,562 and United States Patent Application Ser. No. 506,887 to James P. Shelley, filed on Nov. 8, 1965. Said patents and application for patent are incorporated by reference thereto.

Depending upon the results desired in any particular application, the adhesive compositions utilized herein may be pigmented or dyed as required. Of course, in most cases, laminates are made with unpigmented or undyed adhesive films.

Patterns of regularly recurring spaced geometric units of adhesive emulsion in accordance with the requirements of this invention are generally produced by means of a screen process printing device. The particular device chosen will depend upon many factors, such as cost, speed, availability, etc. One skilled in the art will be able to make this selection without difficulty from the numerous devices commercially available. Usually any screen printing system capable of depositing regularly recurring spaced geometric units of a defined elastomeric adhesive emulsion in sufficient thickness so as to give a substantially dry unit of film with a thickness in the range of 0.001 to 0.010 inch will satisfy the requirements of this invention. Depending in large part upon the particular geometric design to be printed, screens of various mesh and material makeup such as silk, rayon, steel and the like may be employed. In addition to the usual squeegee oriented screen process printers, electrostatic screen printers and similar devices can be used. Circular screen printers are particularly advantageous in that they allow an uninterrupted reproduction of patterns which makes possible a continuous economical process.

Any effective unit of geometric design or configuration may be employed in accordance with this invention. However, the design or configuration of the regularly recurring unit chosen must come within the stated size limitations, that is, 50 to 400 individual units per square inch, preferably 100 to 250 individual units per square inch. In this regard, regularly recurring spaced geometric units consisting of circular dots with diameters in the range of $\frac{1}{32}$ to $\frac{1}{16}$ inch have proven to be particularly effective for satisfying the objects of this invention.

Regularly recurring spaced geometric units of the elastomeric latex acrylic copolymer previously delineated are deposited on a release surface which may consist of or be coated with materials such as polytetrafluoroethylene, polyethylene, silicones and the like. Such geometric units are laid down in a sufficient amount so as to have a thickness in the range of 0.001 to 0.010 inch, preferably 0.002 to 0.005 inch when substantially dry.

After deposition on the release surface of the decorative adhesive composition, all but about 0 to 15% of the moisture content is removed. Various drying means such as ovens, hot air blowers, infrared lights and the like may be employed to achieve the required moisture level. A drying oven with a temperature range of 140° to 220° F. has proven to be particularly satisfactory. Depending upon the temperature of the drying means, a time interval in the range of one second to two minutes will provide sufficient exposure of the film units for the required removal of moisture without prematurely curing the film. Generally, as the temperature of the dryer is increased, the shorter the length of time required for moisture removal. While the particular temperature and time required for substantial drying of any selected group of adhesive film units will vary, one skilled in the art would be able to make such determinations without difficulty.

Preferably, moisture removal will be accomplished at the lower temperature ranges since this will enable the film to have a longer effective shelf life. This phenomenon is due to the fact that the adhesive compositions employed herein are heat-settable, that is, upon heating, the components of the composition react to form a cross-linked insoluble product. Therefore, it is necessary to keep the film from reaching this cross-linked state until complete cure is desired which, of course, is after formation of the fabric laminate.

Transfer of the film units onto a selected finishing fabric takes place after the film is dried to the acceptable moisture content range of 0 to 15%. When the film units are maintained at a temperature in the range of 140° to 200° F., transfer is more easily accomplished. Therefore, transfer of the film units should take place immediately after moisture removal or the film units should be exposed to heating means at the point of transfer. Of course, in a continuous laminating process it would be preferable and most economical to transfer the film units as soon as possible after drying along wtih exposure to heating means.

Immediately after transfer of the film units from the release surface onto a finishing fabric, a backing fabric may be laminated onto the finishing fabric with the film units sandwiched between the two fabrics. Generally, it is preferable to laminate the backing fabric shortly after transfer of the film units from the release surface onto the finishing fabric. However, the finishing fabric with the film units thereon may be stored in that condition where dictated by the exigencies of the situation. Normally, where the finishing fabric and film units are so stored, a release paper is interleaved therein.

Curing of the final laminate takes place where the components are subjected to a heating means having a temperature in the range of about 210° to 500° F. Usually, complete cure can be obtained in as short a time as one second at temperatures of about 500° F. and as long as thirty minutes at temperatures of about 210° F. It should be noted that the temperature range of 210° to 500° F. is that of the heating means and not that of the film units or laminate being cured. The application of pressure in conjunction with the heating will generally shorten the time required for a complete cure. Economical production methods will ordinarily require curing at the higher temperature ranges and shorter times in concurrence with the application of pressure.

Figure 2:
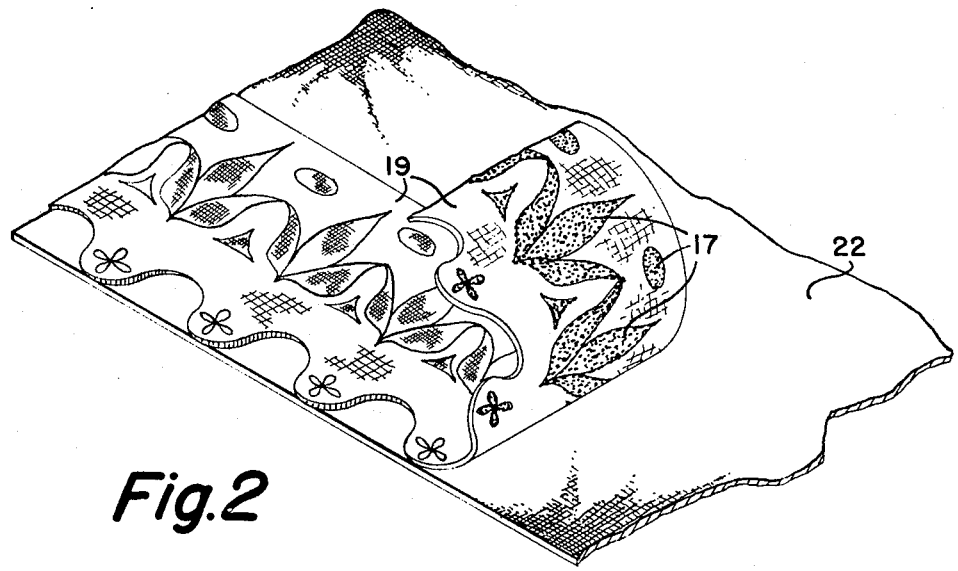

This invention will be more thoroughly understood from the following description along with accompanying drawings which are submitted by way of illustration and not by way of limitation:

FIGURE 1 is a diagrammatic representation of apparatus for producing the fabric lamination of the instant invention; and, FIGURE 2 is a diagrammatic cross-sectional view of the fabric laminate according to the invention.

FIGURE 1 diagrammatically represents a typical apparatus for preparing the fabric laminations of the instant invention. As shown, a flexible transfer belt 10 coated with or consisting of a release material is carried on two rolls 11 and 12, of which 12 is power driven. Transfer belt 10 is contacted by circular screen printer 13 positioned above the belt. Screen printer 13 is supplied with a defined adhesive emulsion from supply vessel 16 through feedline 14 equipped with valve 15. Prints of regularly recurring individual spaced geometric units of adhesive emulsion 17 are made on transfer belt 10 via screen printer 13 and carried through drying oven 18 wherein their moisture content is reduced to within 0 to 15%. The substantially dried adhesive film units 17 are brought into contact with a selected open-work finishing fabric 19 consisting of a network of threads formed into various raised designs. Fabric 19 is fed from supply roll 20. Transfer of film units 17 to finishing fabric 19 takes place at the nip between rolls 12 and 21. Only the film units 17 which are contacted by the closed or raised areas of fabric 19 are transferred onto fabric 19. The remaining film units 17, that is, those not coming into contact with the closed areas of fabric 19 are on occasion transferred to roll 21 where they are removed by doctor blade 21a and accumulated in collector 21b. At the same time many of the film units 17 that were not picked up by the raised areas of fabric 19 remain on transfer belt 10 where they are removed by doctor blade 10a and accumulated in collector 10b. Pressure and temperature of backing roll 21 may be regulated. It is generally advantageous to heat backing roll 21 in the range of 140° to 180° F. in order to facilitate the release of adhesive film units 17 from transfer belt 10 onto the closed fabric mating surface. Backing fabric 22 from supply roll 23 is passed between pressure roll 24 and backing roll 25 where it is laminated onto finishing fabric 19 which is carrying film units 17. Pressure roll 24 and backing roll 25 are maintained at satisfactory temperatures and pressures for forming fabric lamination 26. After formation of the laminate 26, it is passed through curing oven 28 which is maintained at a temperature in the range of 210° to 500° F. Suitable means (not shown) drive rollers 12, 24, and 27 and screen printer 13.

The novel fabric laminate shown in FIGURE 2 consists of finishing fabric 19 and backing fabric 22 with adhesive film units 17 sandwiched between them. A portion of the laminate is separated so as to reveal the adhesive film units 17 as seen prior to lamination.

Selection of individual fabrics to constitute the make-up of any laminate may rest on a broad spectrum of reasons, such as, cost, strength, wearability, elastomeric ability, aesthetic value, availability, etc.

Generally, a fabric of almost any textile composition may be used as either a finishing or backing fabric in accordance with this invention. Textiles made from fibers such as nylon, cotton, acetate, rayon, polyester, spandex, acrylic and mixtures thereof in addition to the non-woven fabrics are typical of those employed within this invention.

Finishing fabrics within the ambit of this invention may, of course, vary in textile composition. However, finishing fabrics will always have substantial open or recessed portions or a substantially uneven surface. This uneven surface will usually result from one portion of the fabric being more heavily patterned than an adjoining portion. Laces and embroideries are typical of the finishing fabrics employed within this invention.

Backing fabrics may vary widely in composition and appearance. Usually, fabrics having a relatively even or smooth surface will serve most satisfactorily. However, when desired a backing fabric may also have an uneven surface or a substantial number of recessed or open areas throughout. Particularly important is the fact that an extremely sheer backing fabric may be utilized without adhesive strike-thru. For example, a nylon lace may be laminated to a sheer nylon tricot in such a manner so as to form a border of lace on the backing fabric. A laminate so prepared is especially valuable for lingerie, and in particular, women's slips.

The terms "raised," "patterned," and "closed" when used in reference to the fabrics employed in this invention and claims may be considered as synonymous. All or any combination of these terms may be utilized to describe those portions or areas of a fabric, normally a combination of threads, which are more compressed or would tend to be grouped into a particular design which would stand out from the surrounding or adjacent material. Likewise, the terms "recessed," "background," and "open," when used in reference to the fabrics employed in this invention and claims may also be considered as synonymous. All or any combination of these terms may be utilized to describe portions or areas of a fabric which are normally less conspicuous, subdued or withdrawn in comparison to the surrounding or adjacent material.

Laminates prepared in accordance with the economical method of this invention have exhibited excellent drape, hand, breathability, peel strength, dry cleanability, and machine washability. Because the laminates exhibit such highly desirable qualities, innumerable uses for them are evident throughout the spectrum of textile utilization.

Either the backing or finishing fabric used in this invention may consist in itself of a fabric laminate. That is, multi-laminations are possible and may be quite desirable in certain applications. For example, a reversible drape may be made by laminating different lace fabrics on both sides of a substantial backing fabric. There is, of course, no limit on the valuable variations which may be employed in accordance with this invention.

The following example is offered by way of illustration and not by way of limitation. Unless otherwise specified, all parts are by weight.

*Example*

A 45% solids aqueous latex was prepared by copolymerizing 80 parts of ethyl acrylate, 18.5 parts of 2-ethylhexyl acrylate, and 1.5 parts of N-methylolacrylamide in an aqueous dispersion using a free radical catalyst. To 80 parts of the above described latex there was added 19.2 parts of a 70% solids methylated melamine-formaldehyde condensate and 0.8 part of triethanolamine. An aqueous dispersion having 47% solids resulted from the above combination.

An elastomeric adhesive composition suitable for screen printing was prepared as follows:

3200 parts of the above described aqueous dispersion and 14 parts of a 25% aqueous solution of ammonium thiocyanate were charged to a mixing vessel and stirred for about one minute. In a separate mixing vessel, 220 parts of a 28% solids solution of a copolymer comprising 60% ethyl acrylate and 40% methacrylic acid were mixed with 220 parts of deionized water. This second solution was slowly added to a vessel containing the first solution under high speed agitation. After addition of the second solution and with continued high speed agitation, 60 parts of (28%) aqueous ammonia were added. With the addition of the ammonia, the mixture thickened rapidly. Agitation was continued for about 15 minutes thereafter. The resulting elastomeric adhesive composition had a viscosity of 100,000 cps.

An apparatus similar to the one illustrated in FIGURE 1 of the accompanying drawings was equipped with a circular screen printer and a 150 denier 60 mesh screen of polyethylene terephthalate fiber bearing a regularly recurring pattern of circular dots $\frac{1}{32}$ of an inch in diameter being spaced so as to form about 225 dots per square inch. Circular dot prints of the elastomeric adhesive emulsion described above were deposited on a polytetrafluoroethylene-coated glass fabric release belt traveling at the rate of 60 feet per minute. The belt bearing the circular dots of emulsion was passed through a 150-foot drying oven maintained at a temperature of about 180° F. After passage through the oven, the adhesive film units have a moisture content in the range of 5 to 10% and a thickness in the range of 0.002 to 0.005 inch. Subsequently, the substantially dried circular dots are brought into contact with a white cellulose acetate lace which picks up the dots on its raised or heavily patterned areas. Thereafter, a white cellulose acetate tricot backing fabric is laminated onto the lace with the adhesive dots sandwiched between the two fabrics. The fabric laminate was passed between doubling rolls maintained at a pressure of 15 pounds per linear inch at the roll tangent point. After subjection to pressure, the laminate proceeded through an infrared oven with a temperature of approximately 400° F. ambient and flash cured. The cured laminate was collected on a chill roll and cooled to room temperature.

The laminate so produced had a soft, natural hand without the presence of undesirable stiffness or similar irregularities. It had a unique and pleasing appearance in addition to an excellent drape. Peel strength was greater than commercial requirements for laminates of a similar nature. It was easily machine washed and dry cleaned without impairment of its valuable properties or characteristics.

In a manner similar to that described above, fabric laminates were prepared from the following textile combinations:

(1) knitted nylon lace/50 denier nylon tricot
(2) cotton lace/circular knit cotton
(3) cellulose acetate lace/50 denier nylon tricot
(4) cotton lace/broadcloth
(5) nylon lace/420 denier powernet nylon
(6) nylon embroidery/50 denier nylon tricot
(7) cellulose acetate embroidery/cellulose acetate tricot.

These laminates had also exhibited such characteristics as good hand, drape, peel strength, dry cleanability, and machine washability.

I claim:

1. A method of preparing fabric laminates which comprises:
    (a) depositing regularly recurring spaced geometric units in the range of about 50 to 400 units per square inch of an elastomeric adhesive emulsion on a release surface in sufficient thickness so as to give substantially dry film units with a thickness in the range of 0.001 to 0.010 inch,
    (b) drying the units of adhesive emulsion so as to reduce their moisture content to the range of 0 to 15% based on the total weight of the film units,
    (c) transferring to the raised patterned portions of a finishing fabric the substantially dried adhesive film units,
    (d) laminating a backing fabric onto the finishing fabric with an effective amount of adhesive film units sandwiched between the backing fabric and the raised patterned portions of the finishing fabric, and
    (e) curing the laminate.

2. A method of preparing fabric laminates according to claim 1 wherein the regularly recurring spaced geometric units of an elastomeric adhesive emulsion are deposited on a release surface in sufficient thickness so as to give a substantially dry film unit with a thickness in the range of 0.002 to 0.005 inch.

3. A method of preparing fabric laminates according to claim 1 wherein the regularly recurring spaced geometric units of an elastomeric adhesive emulsion are deposited on a release surface in the range of about 100 to 250 units per square inch.

4. A method of preparing fabric laminates according to claim 1 wherein the elastomeric adhesive emulsion is a latex of an acrylic copolymer containing amido and/or methylolamido functionality.

5. A method of preparing fabric laminates according to claim 1 wherein the moisture content of the units of adhesive emulsion are reduced to the range of 2 to 9% based on the total weight of the film units.

6. A method of preparing fabric laminates according to claim 1 wherein the laminate is cured at a temperature in the range of 210° to 500° F.

7. A method of preparing fabric laminates according to claim 1 wherein the finishing fabric is a lace type material.

8. A method of preparing fabric laminates according to claim 1 wherein the finishing fabric is an embroidery.

9. A method of preparing fabric laminates according to claim 1 wherein the finishing fabric is a nylon lace and the backing fabric is a nylon tricot.

References Cited

UNITED STATES PATENTS

| 3,325,339 | 6/1967 | McBournie | 161—92 X |
| 3,257,262 | 6/1966 | Epstein | 161—89 |
| 3,251,727 | 5/1966 | Reynolds et al. | 161—89 X |
| 2,758,045 | 8/1956 | Heaton et al. | 161—88 X |
| 2,603,575 | 7/1952 | Schramm | 117—16 |
| 2,541,761 | 2/1951 | Harrison | 161—67 X |
| 2,291,545 | 7/1942 | Ganz et al. | 264—45 X |

OTHER REFERENCES

Horn: Acrylic Resins, 1960, pp. 97–98, pp. 5–6, Reinhold Publ. Corp.

ROBERT F. BURNETT, *Primary Examiner.*

M. A. LITMAN, *Assistant Examiner.*